United States Patent [19]

Butler

[11] Patent Number: 4,870,949
[45] Date of Patent: Oct. 3, 1989

[54] WIND RESISTANT TWO AXIS TRACKER FOR ENERGY OR RADIATION CONCERTRATORS

[76] Inventor: Barry L. Butler, 980 Santa Estella, Solana Beach, Calif. 92075

[21] Appl. No.: 77,758

[22] Filed: Jul. 27, 1987

[51] Int. Cl.$^4$ ................................................. F24J 3/02
[52] U.S. Cl. .................................... 126/424; 126/425; 126/438; 126/439; 350/630; 353/3
[58] Field of Search ............... 126/424, 425, 438, 439, 126/451, 417; 350/631, 634, 636, 608; 353/3

[56] References Cited

U.S. PATENT DOCUMENTS

| | | | |
|---|---|---|---|
| 670,916 | 3/1901 | Eneas | 126/438 |
| 1,220,091 | 3/1917 | Goff | 126/440 X |
| 4,136,671 | 1/1979 | Whiteford | 126/271 |
| 4,245,616 | 1/1981 | Wyland | 126/425 |
| 4,333,446 | 6/1982 | Smyth | 350/630 X |
| 4,559,926 | 12/1985 | Butler | 126/438 |
| 4,590,921 | 5/1986 | Dane | 126/438 |
| 4,599,995 | 7/1986 | Dane | 126/438 |

OTHER PUBLICATIONS

Fujita, et al., "Projected Techno-Economic Characteristics of Solar Thermal Parabolic Dish-Electric Power Modules" (Jet Propulsion Laboratory, Calif. Institute of Technology, DOE/JPL-1060-93, Sept. 15, 1985, JPL Publication 85-87).

Primary Examiner—Larry Jones
Attorney, Agent, or Firm—Dorr, Carson, Sloan & Peterson

[57] ABSTRACT

A wind resistant, two axis tracker is used to direct a solar reflector, heliostat, or dish antenna. An elevation drive ring is supported in a vertical orientation by dolly wheels rotatably attached to a base. The reflector is attached at two points along the circumference of the elevation drive ring. In the prreferred embodiment, a reflector having a diameter slightly less than the inside diameter of the elevation drive ring is mounted to the elevation drive ring. A number of support members, such as cables, extend from the elevation drive ring to the periphery of the reflector. Azimuth adjustment is either provided by incorporating a horizontal turntable or drive ring as part of the base, or by pivoting the reflector within the elevation drive ring by adjusting the respective lengths of the support cables extending laterally from the elevation drive ring to the periphery of the reflector.

15 Claims, 3 Drawing Sheets

WIND RESISTANT TWO AXIS TRACKER FOR ENERGY OR RADIATION CONCERTRATORS

BACKGROUND OF THE INVENTION

This invention pertains to the structure and tracking of single heliostats and dish concentrators. It is related to the centerless drive technology disclosed by applicant in U.S. Pat. No. 4,559,926 and further includes methods for azimuth tracking. The tracking system disclosed herein minimizes the wind distortions on the reflecting surface and effectively transmits these wind-induced loads to the base of the system. This tracker uses centerless-drive for elevation tracking combined with centerless-drive or pivot azimuth tracking. The collector dish has a focal length to diameter ratio near 0.6 and can provide both for the collection of solar energy and the collection of satellite TV or similar signals. The collector may serve different purposes at different times of the day (i.e., to collect solar energy by day and satellite TV in the evening) by changing the receiver at the focus.

PRIOR ART

Tracking concentrators are used to focus solar energy and other forms of radiation onto a receiver which collects the concentrated radiation or signal for use. Dish systems comprise a receiver mated to each parabolic or spherical dish reflector. When used as a solar collector the parabolic dish offers the highest concentration of solar radiation, near 2,000 suns, and can operate at temperatures near 5,000 degrees Centigrade. Each dish system requires three essential components: (1) a parabolic or spherical reflector, (2) an energy receiver, and (3) a structural support and tracker system. The tracker must keep the reflector pointed at the sun or energy source so that the reflected energy will be focused on the receiver. Solar central receiver systems have a single tower mounted receiver and a field of tracking reflecting mirrors called heliostats which redirect the incoming radiation to the receiver. The reflection surface is nearly flat or slightly spherically concave. The concentrator consists of: (1) a number of reflecting surfaces, (2) a tower mounted energy receiver, and (3) the tracker system. The tracker must point the reflecting surface so that its normal bisects the azimuth and elevation angles between the source of the radiation and the energy receiver. Thus the reflected radiation will be continuously directed to the receiver.

The prior art contains a number of examples of methods for azimuth and elevation tracking of energy concentrating antennas and solar collectors. Most conventional heliostat and dish trackers use pedestal mounted gear box drives to provide azimuth and elevation control. Wind loads on large area reflectors place very large torques and moments on these gear boxes. Most of these devices simply resist wind and gravity loadings with increased structural weight. The tracker system described herein reacts these torques and moments using chains, belts or cables on rings of large diameter, so that wind generated forces and moments are reacted using long moment arms. Wind induced loads and moments in the tracking structure are reacted by the structure and not concentrated in the tracker drive train. This unique system takes advantage of the fact that the reflector supporting structure is strong and stiff normal to the reflector surface where the wind loads are the greatest. The structure is weaker and less stiff with the reflector parallel to the wind, where wind loads are much less. This allows the weight and cost of the system to be greatly reduced.

The prior art does not recite the use of centerless elevation drive teamed with a ground-based pivot or turntable azimuth drive for reflectors to effectively reduce the structure and weight of materials needed to resist wind and gravity loads. The prior art also does not recite the use of a reflector structure supported from a ring frame at its periphery.

SUMMARY OF INVENTION

In summary, the present invention is a wind resistant, two axis tracker in which the reflector is attached at two points across the diameter of an elevation drive ring. A number of support members, such as cables, extend from the elevation drive ring to the periphery of the reflector. The elevation drive ring is supported in a vertical orientation by dolly wheels rotatably attached to a base. Azimuth adjustment is provided: (1) by incorporating a horizontal turntable or centerless-drive ring as part of the base; or (2) by pivoting the reflector within the elevation drive ring either by adjusting the respective lengths of the support cables extending from the elevation drive ring to the periphery of the reflector; or (3) by an axial drive motor attached directly to the reflector.

The primary object of the present invention is the combination of the centerless drive elevation tracking system with high strength and light weight membrane reflectors and other structural reflectors, which benefit from edge support provided by this two axis tracking system.

Another object of the present invention is to provide a tracking system which can be used as an integral part of a system to concentrate solar and other forms of radiation.

Additional objects, advantages and novel features of the invention will be set forth in part in the description which follows and in part will become apparent to those skilled in the art upon examination of the following. Others may be learned by practice of the invention. The objects and advantages of the invention may be realized and attained by means of the instrumentalities and combinations particularly pointed out in the appended claims.

DETAILED DESCRIPTION OF THE PREFERRED EMBODIMENT

Figure 1:
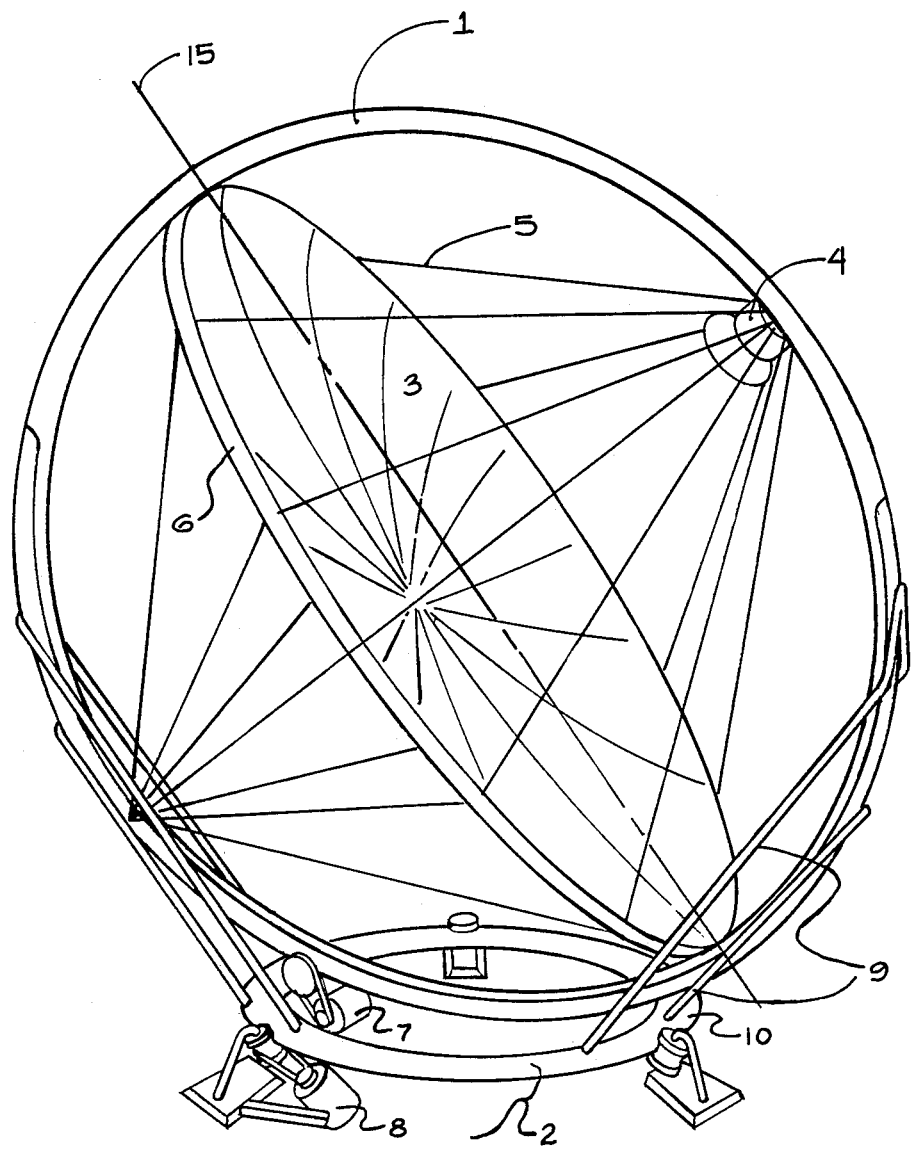
FIG. 1 is a perspective view of a parabolic dish system, embodying the present invention, showing both azimuth and elevation tracking.

Referring now to the drawings and especially FIG. 1, a dish solar collector system is shown comprised of a centerless elevation drive ring 1, an azimuth drive system 2, a reflector 3, a receiver 4, supporting members 5, and a reflector support ring 6. The elevation ring is driven by a motor and gear assembly 7, which engages the elevation drive ring via teeth, cable, belt or chain drive. The azimuth drive motor 8 drives the azimuth turn table, which rotates the elevation ring and reflector about its vertical azimuth axis. More than one azimuth turn table can be run by a single motor, if desired. The azimuth turn table consists of a base ring 10 mounted on a number of support wheels, and members 9 to provide lateral support to the elevation drive ring.

The reflector surface is supported by a number of support members extending from the elevation drive ring to the periphery of the reflector. This type of structure is particularly suited to stressed membrane mirror modules which consist of a reflector membrane stretched over a ring frame similar to a drum head, since reflectors of this type need to be held by a frame on their outer edge.

Figure 2:
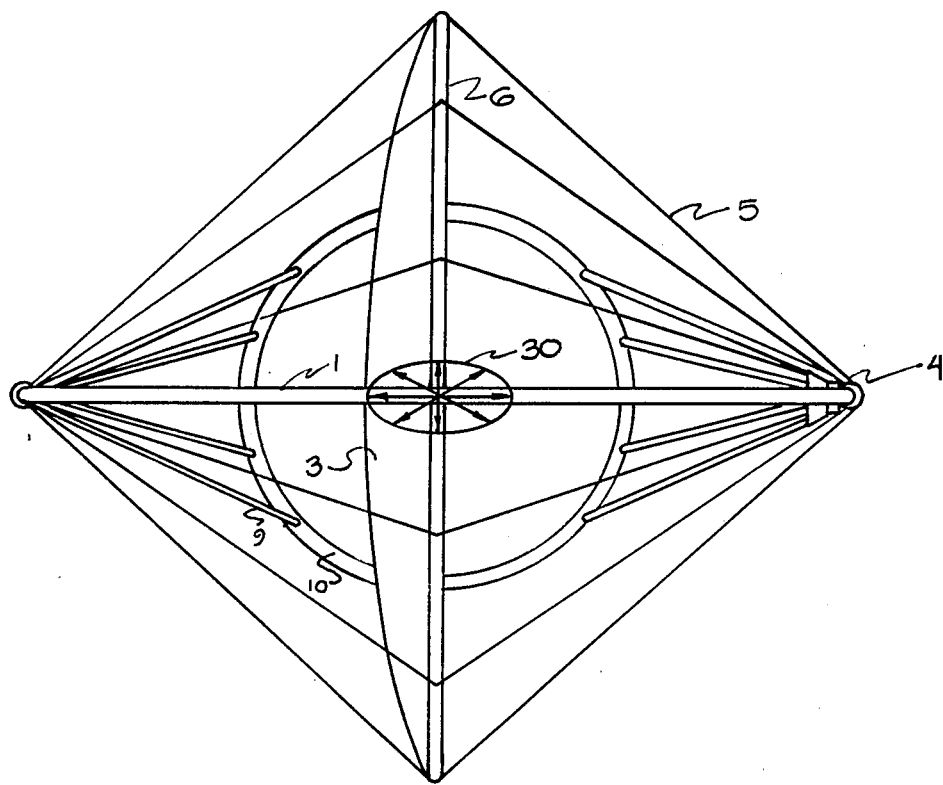
FIG. 2 is a top view corresponding to FIG. 1, showing how wind forces on the reflector vary with wind direction.

The forces resulting from wind loading on the dish are shown in FIG. 2. With the reflector facing horizontally and looking down from the top, the elevation drive ring 1 and the azimuth drive ring 10 can be seen. The receiver 4 is located at the focal point of the reflector and is attached to the elevation drive ring. A schematic depiction of the forces 30 exerted by wind on the reflector is shown on the top center of the elevation drive ring 1. The maximum wind force is parallel to the elevation drive ring, and the minimum wind force is parallel to the reflector. The support members 5 distribute the wind loads from the reflector ring 6 to the elevation drive ring. Note that the structure is strongest and stiffest in the direction parallel to the elevation drive ring, which is the same direction where the wind loads are the greatest. Conversely the structure is weakest in the direction parallel to reflector ring 6 where the wind loads are lowest. Thus the structure is efficiently used to minimize weight while supporting the structure against wind loading.

Conventional heliostats and dishes usually have a single pedestal for support and a separate azimuth and elevation drive system attached to the top of the pedestal and attaching to the center of the back of the reflector module. Since stressed membrane reflectors do not have a place for attachment near the center, a radial truss support frame must be used to attach the central pivot drive to the ring frame, adding cost and weight. The centerless-drive approach attaches the reflector directly to the elevation drive ring in two places (usually across the diameter of the reflector) and allows for additional support members, cables or rods. Gear box type azimuth and elevation drives used on a single pedestal are expensive because of the concentration of all of the wind loads and moments onto the gears and shafts in the gear box. In gear box applications, backlash and play must be eliminated or tracking errors will result. The centerless drive concept does not focus the forces and moments into a gear box. Instead, these forces are reacted by inexpensive drive chains, belts or gears near the rim, at a large distance from the center, where the effects of backlash from the drive mechanism are one to two orders of magnitude less than near the center For example, assuming 0.1 degree of rotation on a 10 inch diameter gear, 0.0087 inch tooth motion is equivalent to 0.2094 inches of motion on a 240 inch diameter hoop. Thus a drive system attached to the large hoop rim must drive to within 0.2094 inches to maintain a 0.1 degree tolerance, while the small pedestal-mounted gear must be positioned to within 0.0087 inches for the same tolerance. The elevation drive ring also has a much larger mechanical advantage in tracking the collector, i.e., 24 to 1 for the 240 inch ring compared to the 10 inch gear.

The present invention allows the wind and gravity loads on the reflector to be distributed to the elevation drive ring. Once these loads are in the elevation drive ring they are transmitted to the drive system and to the foundation structure. This approach to distributing and reacting wind loads is analogous to how sailboat rigging reacts the loads on a large sail. The wind load on the reflecting membranes is carried to the edge of the reflector by membrane tension. From there the reflector ring loads are transmitted to the elevation drive ring via direct contact in two places and through support members from other points along the reflector's circumference. This approach effectively distributes the wind loads into the elevation drive ring. Because of the small cross sectional area presented to the wind, the wind loads normal to the elevation drive ring are kept at a minimum. The arrangement is analogous to a sail feathered into the wind. In this way the requirements for elevation ring out of plane strength and stiffness are minimized. The elevation drive system reacts the moment about the reflector elevation axis and the azimuth drive and elevation drive ring support structure react the wind overturning moment and shear forces at ground level.

The low weight of the drive system combined with the low center of gravity allows for dish deployment similar to that described for the heliostat system discussed below. With the support members 5 released, the reflector is pivoted about axis 15. This allows the dish to be rotated to near parallel with the elevation drive ring and thereby collapsed to a narrow unit for transport to the deployment site. Benefits of this system include ease of deployment, simple ground foundation elements and structure to efficiently resist wind loading. Major advantages of this centerless drive tracking system are: (1) low system weight; (2) location of the drive motors near ground; (3) the ability to stow the reflector face down in bad weather or at night; and (4) the ability to bring the receiver to ground level for service.

The azimuth tracking and support system must resist shear and overturning moments at ground level about the azimuth rotation axis. As the reflector diameter (and hence area of the base) increases, the ground or building roof forces needed to resist the overturning moments are reduced. Because the wind loads can be distributed over a large area base or footprint, the reflector can be building roof mounted. The azimuth pivot can be as simple as a turntable, with stabilizing arms, which rides just about the ground during normal operation without strong winds. When strong winds occur, the arms contact the ground and transmit the wind loads around the drive directly to the ground or roof. For heliostats the wind loading is carried to the foundations through the elevation drive foundation and the tension members or guy wires which anchor it. This type of mounting system distributes the load over a large area and would be suitable for roof mounting.

Figure 3:
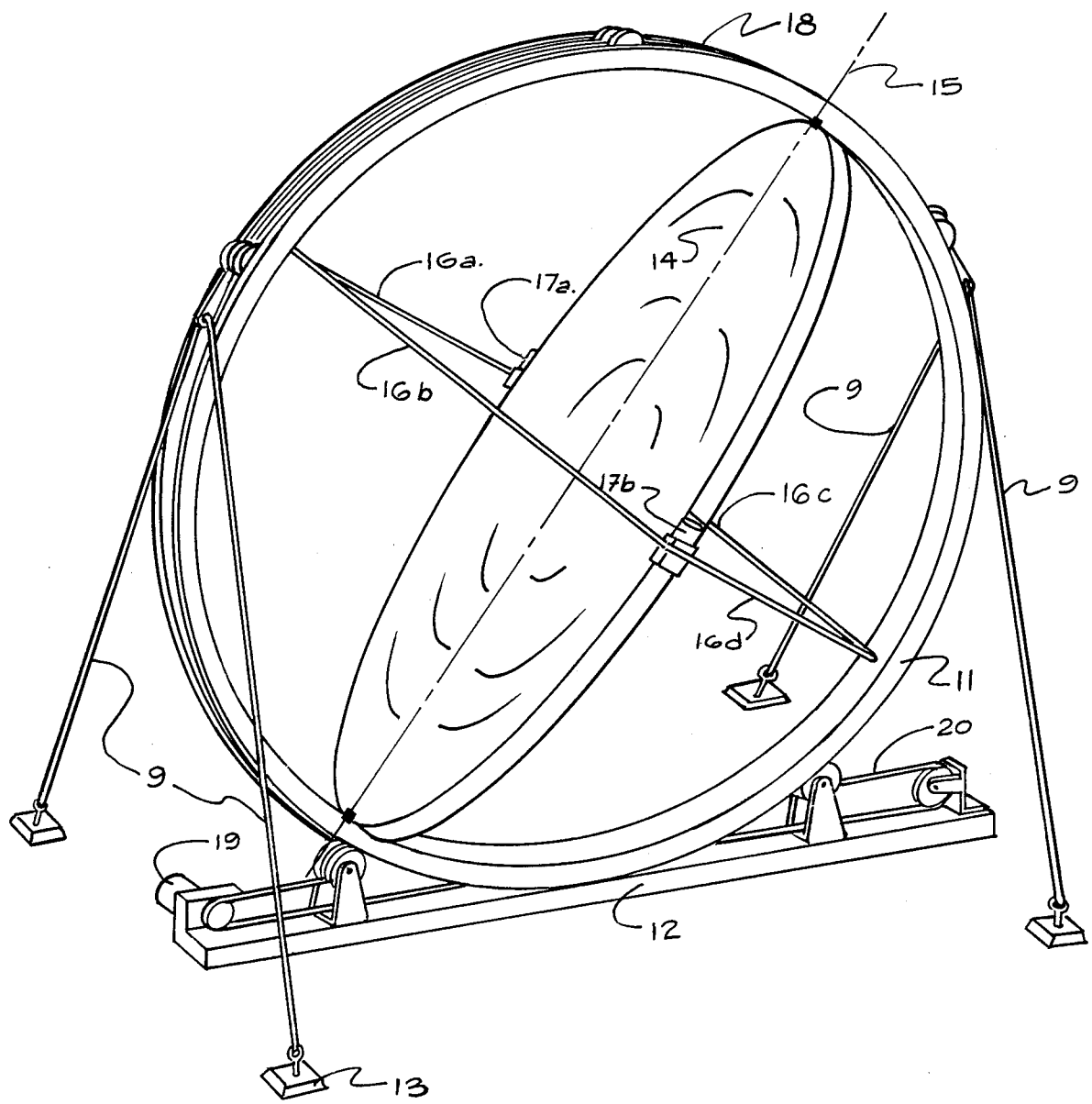
FIG. 3 is a perspective view of a second embodiment of the present invention, showing elevation tracking and an alternative means of azimuth tracking.

Another approach to heliostat tracking shown in FIG. 3 looks similar, but has three major differences. First, there is no azimuth turn table. The supports for the elevation drive ring 11 are fixed to the centerless drive elevation ring base 12. The base cables 9 may be attached to or extensions of the base platform, or may be mounted to separate foundations 13. The second difference is that the reflector 14 is almost flat and is only slightly dished. Third, the reflector pivots on the axis 15 which is a variably tilted axis within the elevation drive ring 11. The members 16 supporting the reflector are arranged to provide for the rotation of the reflector about axis 15. If support member 16 is a cable attached to a winch drum 17, and the winch mechanisms are constrained to rotate simultaneously, by physical or electrical connection, then as the winches operate cables 16a and 16d become longer as cables 16b and 16c becomes shorter, rotating the mirror module clockwise about axis 15 and vice versa for counter clockwise rotation. These two drive axes allow the heliostat to emulate azimuth and elevation tracking. Alternatively, a motor could be placed on the elevation drive ring 11 at axis 15 to directly rotate the reflector 14. This heliostat tracking and support system allows for face down stowing of the reflector and unlike pedestal mounted heliostats, does not have an over-the-shoulder singularity when used in south field locations. The elimination of the singularity eliminates the need for a high speed azimuth drive requirement. The elevation drive motor and gear box 19, drive the main elevation ring through cable, belt, chain or gear arrangement. A drive cable 20 is shown. Deployment of this heliostat is simplified, since it can be assembled in a protected area and with the reflector rotated be nearly parallel to the elevation drive ring. The system can then be placed on a truck or trailer and driven to its foundation. The system is easily attached to the foundation by men working at ground level. In contrast, pedestal designs require the pedestal to be set into a drilled hole and cemented into place. The reflector is then lifted by a crane and then attached to the gear box drive on top of the pedestal. Even a slight breeze, i.e., 5 mph, makes the lifting of the reflector by a crane very dangerous, since the reflector acts like a large sail. With the heliostat system shown in FIG. 3, the elevation drive ring and reflector can be assembled at location shielded from the wind, and can then be deployed at the site in winds up to 27 mph without danger. The large base area of this heliostat combined with its light weight make it suitable for mounting on the room of a building.

The foregoing is considered as illustrative only of the principles of the invention. Further, since numerous modifications and changes will readily occur to those skilled in the art, it is not desired to limit the invention described and accordingly all suitable modifications and equivalents may be resorted to, falling within the scope of the invention.

I claim:

1. A wind resistant two axis tracker for reflectors, comprising:
   (a) A base;
   (b) An elevation drive ring, supported in a vertical position by dolly wheels rotatably attached to said base, adapted for centerless rotation on said dolly wheels about a horizontal axis;
   (c) A reflector attached at two points along the circumference of the elevation drive ring, without direct attachment to said base; and
   (d) A plurality of support members extending from the elevation drive ring to the periphery of the reflector.

2. The tracker of claim 1, wherein the base comprises a horizontal turntable to allow azimuth adjustment of the elevation drive ring.

3. The tracker of claim 1, wherein the base comprises an azimuth drive ring supported by a number of support wheels, and to which are attached the dolly wheels used to support the elevation drive ring.

4. The tracker of claim 1, further comprising a receiver attached to the elevation drive ring, to receive the radiation reflected by the reflector.

5. The tracker of claim 1, wherein the reflector is attached at two points across the diameter of the elevation drive 6. A wind resistant two axis tracker for reflectors, comprising:
   (a) A base;
   (b) An elevation drive ring supported in a vertical position by dolly wheels rotatably attached to the base, adapted for centerless rotation on said dolly wheels about a horizontal axis;
   (c) A dish-shaped reflector attached at two points across its diameter to the elevation drive ring, without direct attachment to said base, said reflector being oriented perpendicular to the plane of the elevation drive ring;
   (d) A plurality of support members extending from the elevation drive ring to the periphery of the reflector.

7. The tracker of claim 6, wherein the support members comprise cables extending from the elevation drive ring to the periphery of the reflector.

8. The tracker of claim 6, wherein the base comprises a horizontal turntable to allow azimuth adjustment of the elevation drive ring.

9. The tracker of claim 6, wherein the base comprises an azimuth drive ring, supported by a number of support wheels, and to which are attached the dolly wheels used to support the elevation drive ring.

10. The tracker of claim 6, further comprising a receiver attached to the elevation drive ring, to receive the radiation reflected by the reflector.

11. The tracker of claim 6, wherein the reflector is attached at two points across the diameter of the elevation drive ring.

12. A wind resistant two axis tracker for reflector, comprising:
   (a) A base;
   (b) An elevation drive ring, supported in a vertical position by dolly wheels rotatably attached to the base, adapted for centerless rotation on said dolly wheels about a horizontal axis;
   (c) A reflector rotatably attached at two points along the circumference of the elevation drive ring, without direct attachment to said base;
   (d) A number of cables extending from the elevation drive ring to the periphery of the reflector; and
   (e) Drive means for adjusting the lengths of said cables between the elevation drive ring and the periphery of the reflector, to thereby rotate the reflector with respect to the elevation drive ring.

13. The tracker of claim 12, wherein the reflector is dish-shaped, and is rotatably mounted at two points across its diameter to the elevation drive ring.

14. The tracker of claim 12, further comprising:
   (a) A flexible belt routed over the elevation drive ring and under the dolly wheels; and
   (b) Drive means for applying a rotational torque to the elevation drive ring by means of the flexible belt.

15. A wind resistant two axis tracker for reflectors, comprising:
   (a) A base;
   (b) An elevation drive ring, supported in a vertical position by dolly wheels rotatably attached to the base, adapted for centerless rotation on said dolly wheels about a horizontal axis;
   (c) A reflector rotatably attached at two points along the circumference of the elevation drive ring, without direct attachment to said base; and
   (d) Drive means to rotate the reflector with respect to the elevation drive ring.

* * * * *